United States Patent
Hosokawa

(10) Patent No.: US 10,267,250 B2
(45) Date of Patent: Apr. 23, 2019

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventor: Yohei Hosokawa, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/870,417

(22) Filed: Jan. 12, 2018

(65) Prior Publication Data
US 2018/0238250 A1  Aug. 23, 2018

(30) Foreign Application Priority Data
Feb. 21, 2017 (JP) ................................. 2017-029884

(51) Int. Cl.
| F02D 41/02 | (2006.01) |
| F02D 41/26 | (2006.01) |
| B60W 20/15 | (2016.01) |
| F02P 5/15  | (2006.01) |
| F02D 41/00 | (2006.01) |
| F02D 41/14 | (2006.01) |

(52) U.S. Cl.
CPC ............ *F02D 41/02* (2013.01); *B60W 20/15* (2016.01); *F02D 41/008* (2013.01); *F02D 41/025* (2013.01); *F02D 41/1498* (2013.01); *F02D 41/26* (2013.01); *F02P 5/1502* (2013.01); F02D 2041/1433 (2013.01); F02D 2250/24 (2013.01)

(58) Field of Classification Search
CPC .. F02D 41/024; F02D 41/025; F02D 41/0085; F02D 41/0255; F02D 41/0235
See application file for complete search history.

(56) References Cited

U.S. PATENT DOCUMENTS

| 2011/0107739 A1* | 5/2011 | Shimizu | ................ F01N 3/2006 60/273 |
| 2012/0255531 A1* | 10/2012 | Kinose | ................ F02D 41/0085 123/673 |
| 2014/0358403 A1* | 12/2014 | Brinkmann | ......... G01M 15/104 701/103 |

FOREIGN PATENT DOCUMENTS

| JP | H09-236033 A | 9/1997 |
| JP | 3572783 B2 | 10/2004 |

* cited by examiner

*Primary Examiner* — Bryan A Evans
(74) *Attorney, Agent, or Firm* — Hunton Andrews Kurth LLP

(57) ABSTRACT

A control apparatus: controls air fuel ratios so that while combustion is performed sequentially through a plurality of cylinders, at least one cylinder where rich combustion is performed and the other cylinders where lean combustion is performed are generated; makes an internal combustion engine execute a catalyst warming operation for promoting warm-up of a three-way catalyst; and controls a second motor generator so that a torque difference between output torque from a rich cylinder where the rich combustion is performed and output torque from a lean cylinder where the lean combustion is performed is eliminated on an output shaft during the catalyst warming operation.

6 Claims, 11 Drawing Sheets $Te = Teb + \Delta Te$
$Tes = Te \times D(\zeta, \theta) \times \rho / (1+\rho)$
$Ter = (Teb + \Delta Te) \times D(\zeta, \theta) / (1+\rho)$
$Tg' = Tg = Teave \times \rho / (1+\rho)$
$Tm' = Tm + \Delta Tm$
$Tmr = (Tm + \Delta Tm) \times Grm$ $$Te = Teb + \Delta Te$$
$$Tes = Te \times D(\zeta, \theta) \times \rho / (1+\rho)$$
$$Ter = Teb \times D(\zeta, \theta) / (1+\rho)$$
$$Tg' = -Teave \times \rho / (1+\rho) + \Delta Tg$$
$$Tm' = Tm + \Delta Tm$$
$$Tmr = (Tm + \Delta Tm) \times Grm$$

CONTROL APPARATUS FOR HYBRID VEHICLE

TECHNICAL FIELD

The present invention relates to a control apparatus for a hybrid vehicle, the hybrid vehicle comprising an internal combustion engine having an exhaust purification catalyst.

BACKGROUND ART

In order to prompt warm up of an exhaust purification catalyst provided to an internal combustion engine, there is known to be a technology such that by switching, for each cylinder, between rich combustion where combustion is executed with an air fuel ratio set on a rich side in comparison to a theoretical air fuel ratio and a lean combustion where combustion is executed with an air fuel ratio set on a lean side in comparison to a theoretical air fuel ratio, unburned fuel introduced to an exhaust passage and oxygen are supplied to the exhaust purification catalyst for oxidization, and by the reaction heat of the oxidization, temperature of the exhaust purification catalyst is raised, and thereby a catalyst warming operation is executed.

In such a catalyst warming operation, in a case that the rich combustion and the lean combustion are executed at their appropriate ignition timing respectively, a torque difference that output torque of a rich cylinder where the rich combustion is executed becomes higher than output torque of a lean cylinder where the lean combustion is executed occurs. For suppressing vibration and noise caused by the torque difference, suggested is a control apparatus which reduces the output torque of the rich cylinder by executing spark retardation where the ignition timing of the rich cylinder is retarded in comparison to its optimum ignition timing, and thereby reducing the torque difference between the output torque of the rich cylinder and the output torque of the lean cylinder (for example, Patent Literature #1).

CITATION LIST

Patent Literature

Patent Document #1: Japanese Patent Publication H09-236033 A.

SUMMARY OF INVENTION

Technical Problem

In a case that the ignition timing of the rich cylinder is retarded in the catalyst warming operation as disclosed in Patent Literature #1, fuel efficiency could be deteriorated by decrease of heat efficiency.

In light of the above, the present invention aims to provide, for a hybrid vehicle comprising an internal combustion engine having an exhaust purification catalyst, a control apparatus for hybrid vehicle, which is capable of reducing or eliminating the torque difference between the cylinders while suppressing deterioration of fuel efficiency of the internal combustion engine when executing the catalyst warming operation.

Solution to Technical Problem

One aspect of the present invention provides a control apparatus for a hybrid vehicle, the hybrid vehicle having: an internal combustion engine; a rotating electrical machine; and an output shaft provided on a transmission path where torque from each of the internal combustion engine and the rotating electrical machine is transmitted, and the internal combustion engine having a plurality of cylinders and an exhaust purification catalyst, wherein the control apparatus executes a computer program to function as: a warming control device which is configured to make the internal combustion engine perform a catalyst warming operation which prompts warm-up of the exhaust purification catalyst by controlling air fuel ratios so as to provide, while combustion of the plurality of cylinders is being progressed sequentially, at least one of the plurality of cylinders performs rich combustion in which an air fuel ratio is at a rich side than a theoretical air fuel ratio and remaining cylinder(s) of the plurality of cylinders perform(s) lean combustion in which an air fuel ratio is at lean side than a theoretical air fuel; and a rotating electrical machine control device which is configured to control torque of the rotating electrical machine so that a torque difference between output torque from a rich cylinder where the rich combustion is performed and a lean cylinder where the lean combustion is preformed is reduced or eliminated on the output shaft.

According to this control apparatus, the rotating electrical machine is controlled so that the torque difference between the output torque from the rich cylinder and the output torque from the lean cylinder is reduced or eliminated on the output shaft during the catalyst warming operation. And, since the spark retardation is not required in order to reduce or eliminate such a torque difference, it is possible to reduce or eliminate the torque difference between cylinders while suppressing deterioration of fuel efficiency of the internal combustion engine caused by the spark retardation. On the other hand, it is allowed to additionally execute a control that a torque difference of an engine shaft torque itself is reduced by the spark retardation to be executed with respect to the rich cylinder during the catalyst warming operation. Also in this case, in comparison to a case that only the spark retardation is executed with respect to the rich cylinder without the above control by the rotating electrical machine, the quantity of spark retardation with respect to the rich cylinder can be made smaller. Accordingly, even in a case where the spark retardation is executed together, it is possible to suppress the deterioration of fuel efficiency of the internal combustion engine in comparison to the case that only the spark retardation is executed.

In one embodiment of the control apparatus of the present invention, the control apparatus may further function as: a compensation torque computing device which is configured to compute compensation torque which is outputted by the rotating electrical machine in order to reduce or eliminate the torque difference on the output shaft; a detection device which is configured to detect a rotational speed of the output shaft; and a correction device which is configured to perform feedback correction of the compensation torque so that a deviation between fluctuations of the rotational speed of the output shaft detected by the detection device and a predetermined criterion is reduced or eliminated during the catalyst warming operation. The fluctuations of the rotational speed of the output shaft are correlated with the torque fluctuations of the output shaft. According to this embodiment, even if the torque difference is not sufficiently reduced or eliminated on the output shaft during the catalyst warming operation because of some reasons, the compensation torque is corrected so that the deviation between the fluctuations of the rotational speed of the output shaft and the predetermined criterion is reduced or eliminated. Thereby, since the torque difference is ameliorated so as to be eliminated sufficiently along with progress of the catalyst warming operation, the reliability of the control is improved.

In one embodiment of the present invention, at least either one of an electric generator which is driven by the internal combustion engine and an electric motor which is capable of transmitting torque to the output shaft may be provided as the rotating electrical machine, and the rotating electrical machine control device may be configured to control torque of at least one of the electric generator and the electric motor which is provided as the rotating electrical machine. According to this embodiment, it is possible to reduce or eliminate the torque difference on the output shaft by controlling torque of at least either one of the electric generator and electric motor which is provided as the rotating electrical machine. In a case that both an electric generator and an electric motor are provided, either one of them may reduce or eliminate a torque difference, or they may share the reduction or elimination of a torque difference.

In the above embodiment, the rotating electrical machine control device may be configured to reduce the output torque of the electric motor at a moment of combustion of the rich cylinder, so that the torque difference is reduced or eliminated on the output shaft during the catalyst warming drive. In this case, since it is required the operation for reducing or eliminating the torque difference is synchronized with combustion of only the rich cylinder, the control could be simplified.

Alternatively, the rotating electrical machine control device may be configured to reduce the output torque of the electric motor at a moment of combustion of the rich cylinder and also increase the output torque of the electric motor at a moment of combustion of the lean cylinder, so that the torque difference is reduced or eliminated on the output shaft during the catalyst warming drive. In this case, during the catalyst warming operation, power consumption of the electric motor increases and also decreases without not only increasing. Due to this, it is possible to reduce change of remaining quantity of an electric storage device such as a buttery provided as a power source of the electric motor.

Further, the rotating electrical machine control device may be configured to increase the output torque of the electric motor at a moment of combustion of the lean cylinder, so that the torque difference is reduced or eliminated on the output shaft during the catalyst warming drive. In this case, during the catalyst warming operation, the torque difference is reduced or eliminated in conformity with the output torque of the rich cylinder which is larger than the output torque of the lean cylinder. Due to this, there is a merit that decrease of drivability is suppressed during the catalyst warming operation.

DESCRIPTION OF EMBODIMENTS

A First Embodiment

Figure 1:
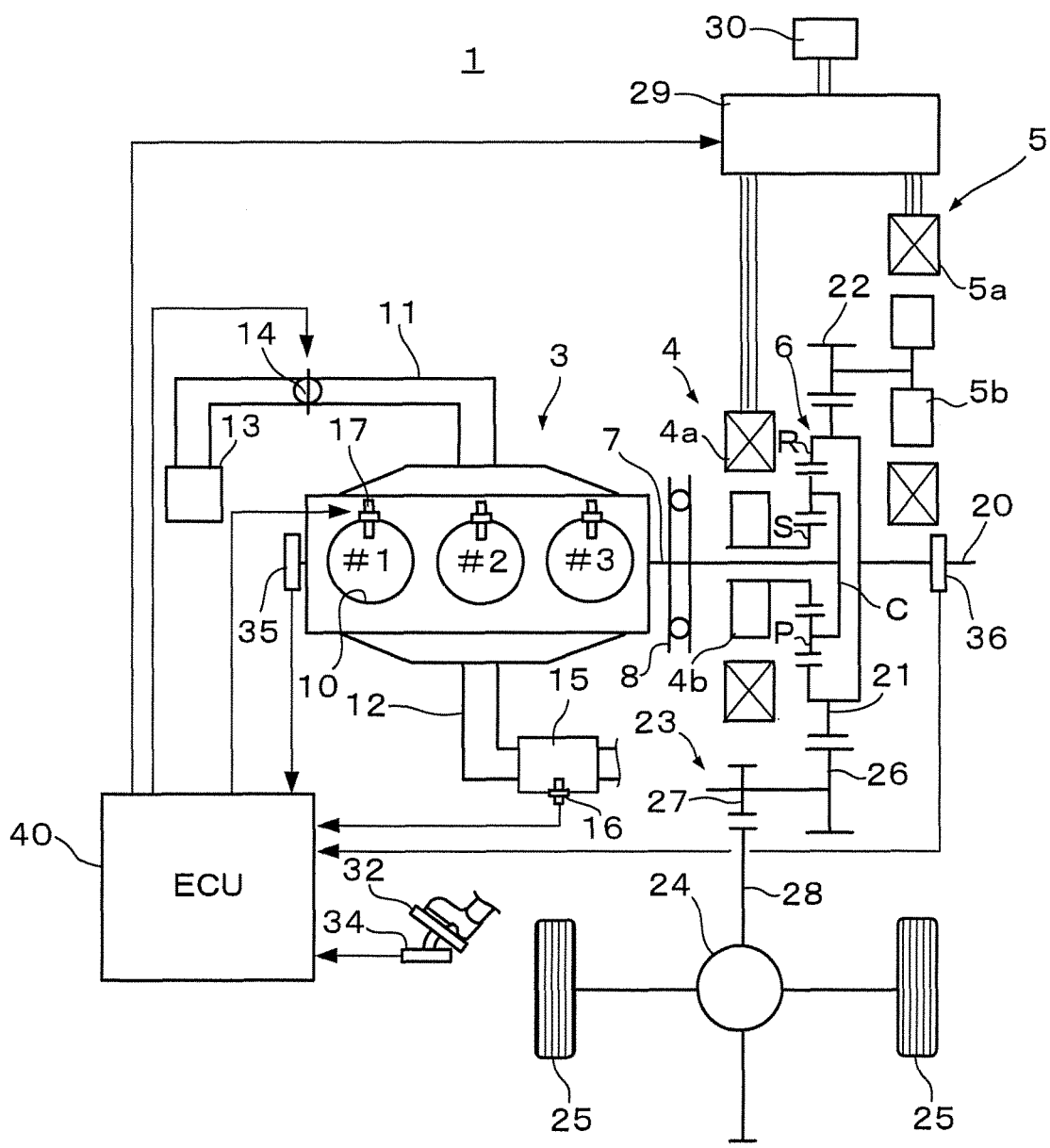
FIG. 1 is a diagram showing an entire configuration of a hybrid vehicle where a control apparatus relating to one embodiment of the present invention is applied.

As shown in FIG. 1, a vehicle 1 is configured as a hybrid vehicle where a plurality of power sources are combined. The vehicle 1 comprises an internal combustion engine 3 and two motor generators: a first motor generator 4; and a second motor generator 5. The internal combustion engine is a serial 3-cylinder internal combustion engine having three cylinders 10. The internal combustion engine 3 performs combustion with equal combustion intervals, each interval being a crank angle 240°. As one example of a combustion order of the internal combustion engine 3, when a cylinder numbers #1, #2, and #3 are assigned to the cylinders 10 from the left side one in FIG. 1 respectively, the combustion order is set to #1→#2→#3→#1 . . . .

To each of the cylinders 10, an intake passage 11 and an exhaust passage 12 are connected. The intake passage 11 is provided with an air cleaner 13 for filtering air and a throttle valve 14 for adjusting an air flow rate. The exhaust passage 12 is provided with a three-way catalyst 15 as an exhaust purification catalyst which purifies harmful components in exhaust gas. The three-way catalyst 15 is provided with a temperature sensor 16 for detecting a temperature (bed temperature) of the three-way catalyst 15. A fuel air mixture is flown into each cylinder 10 of the internal combustion engine 3 via the intake passage 11, and the fuel air mixture flown into each cylinder 10 is ignited by an ignition plug 17 to be burned. Due to the burning in each cylinder 10, output toque is outputted from a crank shaft 7. An air fuel ratio of the fuel air mixture is set to a theoretical air fuel ratio in a normal drive. A catalyst warming operation where the air fuel ratio of the fuel air mixture is changed for promoting warm-up of the three-way catalyst, will be described later.

The internal combustion engine 3 and the first motor generator 4 are connected to a power dividing mechanism 6. The output of the power dividing mechanism 6 is transmitted to an output shaft 20. The output shaft 20 is provided on a transmission path which is capable of transmitting torque of each of the internal combustion engine 3, the first motor generator 4, and the second motor generator 5. The output shaft 20 is provided with an output gear 21 which rotates integrally with the output shaft 20. When the output gear 21 and a motor gear 22 of the second motor generator 5 are engaged with each other, thereby torque of the second motor generator 5 is transmitted to the output shaft 20. Output torque of the output shaft 20 is transmitted to right and left drive wheels 25 via a speed reducer 23 and a differential mechanism 24. The speed reducer 23 has a driven gear 26 and a drive gear 27 which are provided coaxially and rotate integrally with each other. The driven gear 26 is engaged with the output gear 21, and the drive gear 27 is engaged with a ring gear 28 of the differential mechanism 24. Thereby, the torque of the output shaft 20 is, while the rotational speed thereof is being reduced by the speed reducer 23, transmitted to the differential mechanism 24.

The first motor generator 4 has a stator 4a fixed to a not-illustrated case and a rotor 4b disposed coaxially with the stator 4a. The first motor generator 4 mainly functions as an electric generator which accepts power of the internal combustion engine 3 divided by the power dividing mechanism 6 and generates electricity. The first motor generator 4 also functions as an electric motor which is driven by AC power at startup of the internal combustion engine 3 and the like. The second motor generator 5 has a stator 5a fixed to the above mentioned case and a rotor 5b disposed coaxially with the stator 5a, and functions as an electric motor and an electric generator respectively. The respective motor generators 4 and 5 are electrically connected to an HV buttery 30 configured as a nickel-hydrogen buttery, via a motor control device 29. The motor control device 29 has a not-illustrated inverter and a not-illustrated converter therein. The motor control device 29 converts electric power generated by each motor generator 4, 5 into a DC to charge the converted electric power in the HV buttery 30, and also converts the electric power in the HV buttery 30 into an AC to supply the converted electric power to each motor generator 4, 5. In the present embodiment, the second motor generator 5 corresponds to a rotating electrical machine and electric motor relating to the present invention.

The power dividing mechanism 6 is configured as a single pinion type planetary gear mechanism. The power dividing mechanism 6 has a sun gear S, a ring gear R, a pinion P engaging with the gears S and R, and a planetary carrier C holding the pinion P in a rotatable and revolvable matter. The sun gear S is connected to the rotor 4b of the first motor generator 4, the ring gear R is connected to the output shaft 20 so as to be rotated integrally with the output shaft 20, the planetary carrier C is connected to the crank shaft 7 of the internal combustion engine 3. A damper 9 intervenes between the crank shaft 7 and the planetary carrier C, and absorbs torque fluctuations of the internal combustion engine 3.

Control of the vehicle 1 is performed by an electric computer unit (ECU) 40. To the ECU 40, for example, as well as an output signal of the temperature sensor 16, an output signal of an accelerator opening degree sensor 34, an output signal of a crank angle sensor 35, an output signal of a resolver 36, and the like are inputted. The accelerator opening sensor 34 outputs a signal according to an accelerator position of an accelerator pedal 32 mounted to the vehicle 1. The crank angle sensor 35 outputs a signal according to a rotation number (rotational speed) of the internal combustion engine 3. The resolver 36 is one example of a detection device which outputs a signal according to a rotational speed of the output shaft 20. The ECU 40 obtains a state of the vehicle 1 based on the signals from those sensors, and performs various kinds of control to the internal combustion engine 3 and each motor generator 4, 5. The ECU 40 computes a required power required by a driver based on the signal from the accelerator opening degree sensor 34 and the current speed, and controls the vehicle 1 with switching various modes, so that an optimum system efficiency is provided to the required power. For example, in a low load region where a heat efficiency of the internal combustion engine 3 lowers, selected is an EV mode where the burning of the internal combustion engine 3 is stopped and the second motor generator 5 is driven. In a case that torque only from the internal combustion engine 3 is not sufficient, selected is a hybrid mode where the internal combustion engine 3 and the second motor generator 5 are used as driving sources for traveling. In the hybrid mode, the second motor generator 5 is driven and assists drive of the vehicle 1 with using its output. When the vehicle 1 is decelerated, the second motor generator 5 generates electricity by accepting power inputted from the drive wheels 25, and sometimes selected is a regeneration mode where the electric power of the generated electricity is charged in the HV buttery 30.

In a case that it is necessary to promote the warm-up of the three-way catalyst 15, for example, in a case of an unwarmed state that a temperature of the three-way catalyst 15 is less than the activation temperature or the like, the ECU 40 makes the internal combustion engine 3 execute the catalyst warming operation for promoting the warm-up of the three-way catalyst 15. Thereby, the ECU 40 functions as one example of a warming control device relating to the present invention. During the catalyst warming operation, an air fuel ratio is controlled so as to provide, while each cylinder 10 is performing its combustion sequentially, at least one cylinder 10 (hereinafter, sometimes referred to as a rich cylinder) performs rich combustion where an air fuel ratio is at a rich side than a theoretical air fuel ratio and the remaining cylinder(s) 10 (hereinafter, sometimes referred to as a lean cylinder) performs lean combustion where an air fuel ratio is at a lean side than a theoretical air fuel ratio. For example, during the catalyst warming operation, a particular pattern of combustion is repeated according to the combustion order, such as the rich combustion is performed in the #1 cylinder 10, the lean combustion is performed in the #2 cylinder 10, the lean combustion is performed in the #3 cylinder 10, and the rich combustion is performed in the #1 cylinder 10. During the catalyst warming operation, the rich combustion and the lean combustion are mixed, and a combustion mode is switched between the rich combustion and the lean combustion at least one time. Since the cylinder 10 where the rich combustion is performed becomes in a fuel overage state, unburned fuel occurs. The unburned fuel is introduced to the exhaust passage 12 and supplied to the three-way catalyst 15. And then, since the cylinder 10 where the lean combustion is performed, following the rich combustion, becomes in an air overage state, unreacted oxygen is introduced to the exhaust passage 12 and supplied to the three-way catalyst 15. Thereby, at the three-way catalyst 15, the unburned fuel and the oxygen provoke oxidation reaction, and by the heat of reaction, the temperature of the three-way catalyst 15 rises. During the catalyst warming operation of the present embodiment, the #1 cylinder 10 is fixedly set to the rich cylinder, and each of the #2 and #3 cylinders 10 is fixedly set to the lean cylinder. However, it is possible to apply a different embodiment where the catalyst warming operation is executed so that the combustion mode can be switched as appropriate between the rich combustion and the lean combustion with respect to each of the cylinders 10, for example, along with progress of the catalyst warming operation, the #1 cylinder 10 is allowed to change over from the rich cylinder to the lean cylinder, the #2 cylinder 10 is allowed to change over from the lean cylinder to the rich cylinder, and the #3 cylinder 10 is allowed to change over from the rich cylinder to the lean cylinder.

Since thermal energy of rich combustion is large in comparison to the lean combustion, output torque from the rich cylinder is larger than output torque from the lean cylinder. Accordingly, with respect to the output torque, the torque difference occurs between the rich and lean cylinders 10. Due to the torque difference, torque fluctuations of the output shaft 20 are made bigger in comparison to a case in the normal operation, and thereby vibration and noise of the vehicle 1 are sometimes deteriorated. Therefore, the ECU 40 controls the second motor generator 5 so that the torque difference between the output torque from the rich cylinder and the output torque from the lean cylinder is eliminated on the output shaft 20 during the catalyst warming operation. Thereby, the ECU 40 functions as one example of a rotating electrical machine control device. In the present embodiment, the second motor generator 5 is controlled so as to eliminate the torque difference on the output shaft 20. However, in consideration of overshoot or the like, for example, it is possible to apply a different embodiment where the torque of the second motor generator 5 is controlled so that the torque difference is reduced by 90%.

Figure 2:
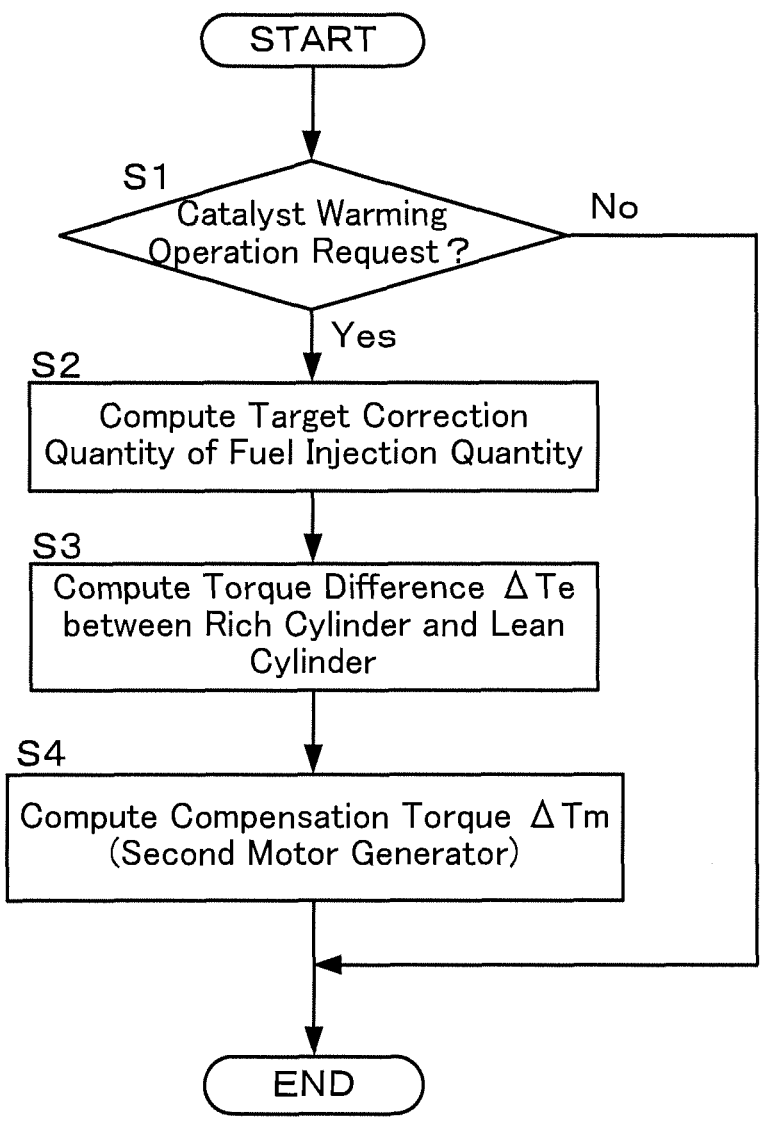
FIG. 2 is a flowchart showing one example of a control routine relating to a first embodiment.

The ECU 40 executes a control routine shown in FIG. 2, as one example of control executed during the catalyst warming operation. A computer program for the control routine shown in FIG. 2 is held in the ECU 40, and by the ECU 40, the computer program is read out as appropriate and executed repeatedly at predetermined intervals.

In step S1, the ECU 40 determines whether or not a catalyst warming operation request exists. It is determined whether or not this request exists, by the ECU 40 referring to a processing result of a not-illustrated control routine executed by the ECU 40 in parallel with the control routine of FIG. 2. In the control routine executed in parallel with the control routine of FIG. 2, for example, the ECU 40 obtains a temperature of the three-way catalyst 15 by referring to the signal from the temperature sensor 16 mounted to the three-way catalyst 15, and when the temperature obtained is lower than a threshold value corresponding to a lower limit of the activation temperature range of the three-way catalyst 15, the catalyst warming operation request is generated. In step S1, in a case that the catalyst warming operation request exists, the ECU 40 goes to step S2. If not, the ECU 40 skips the following steps and ends the current routine.

In step S2, the ECU 40 computes a basic fuel injection quantity based on a required load to the vehicle 1 and the theoretical air fuel ratio, and a target correction quantity of a fuel injection quantity for each cylinder 10 in order to realize the catalyst warming operation. In the catalyst warming operation, an incremental correction quantity of the fuel injection quantity is set as the target correction quantity for the rich cylinder, and a decremental correction quantity of the fuel injection quantity is set as the target correction quantity for the lean cylinder. By such corrections of the fuel injection quantity, for example, the fuel injection quantity for the rich combustion is incrementally corrected by 20% to the basic fuel injection quantity for the normal operation, and the fuel injection quantity for the lean combustion is decrementally corrected by 10% to the basic fuel injection quantity for the normal operation. The degree of each correction of fuel injection quantity, that is, the air fuel ratios of the rich combustion and the lean combustion may be determined as appropriate respectively.

Figure 3:
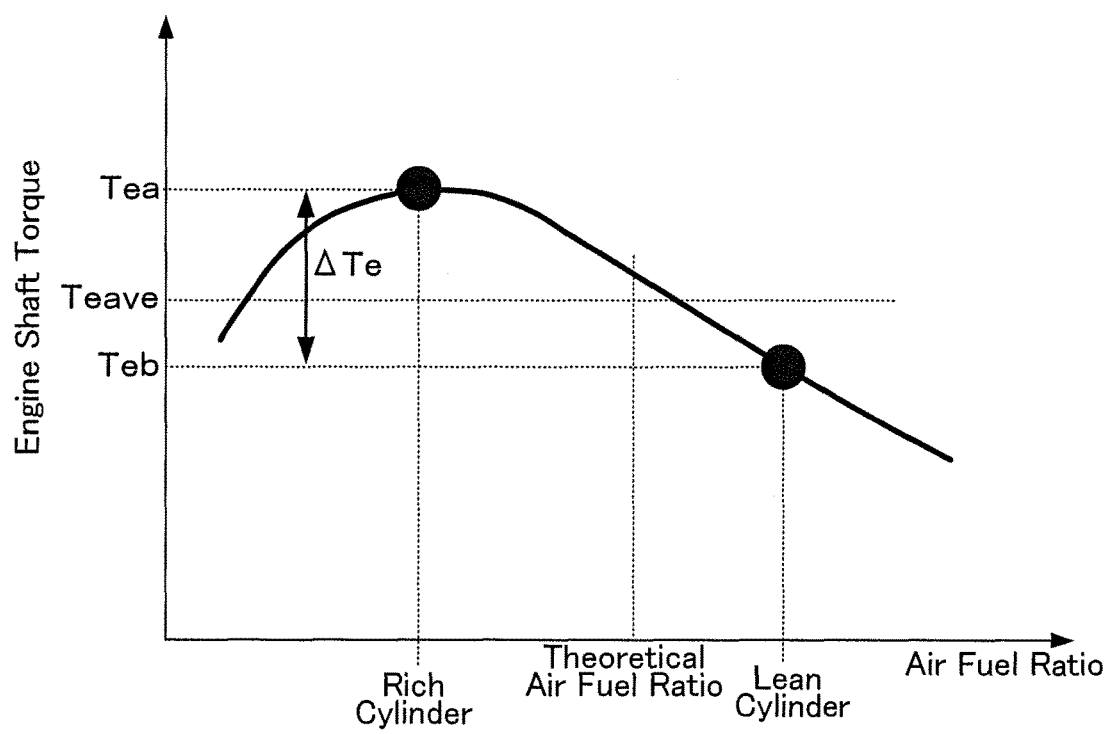
FIG. 3 is a diagram showing a relation between an air fuel ratio and an engine shaft torque.

In step S3, the ECU 40 computes the fuel injection quantity for each of the rich cylinder and the lean cylinder by adding each correction quantity computed in step S2 to the basic fuel injection quantity, and computes the torque difference $\Delta Te$ between output torque which could be generated by the corresponding fuel injection quantity with respect to the rich cylinder and output torque which could be generated by the corresponding fuel injection quantity with respect to the lean cylinder. For example, as shown in FIG. 3, in a case that an average value of the output torques generated by the cylinders 10 in the catalyst warming operation is set to an average torque Teave, the output torque Tea to be outputted from the rich cylinder is larger than the average torque Teave, and the output torque Teb to be outputted from the lean cylinder is smaller than the average torque Teave. A difference between the output torques Tea and Teb corresponds to the torque difference $\Delta Te$. The torque difference $\Delta Te$ may be computed by the ECU 40 which searches a calculation map (not illustrated) made by prototype tests, simulations, or the like, the calculation map having a data structure for giving the torque difference $\Delta Te$ using variables which are the fuel injection quantity of the rich cylinder and the fuel injection quantity of the lean cylinder.

Back to FIG. 2, in step S4, the ECU 40 computes compensation torque $\Delta Tm$. The compensation torque $\Delta Tm$ is torque of the second motor generator 5 necessary to eliminate on the output shaft 20, the torque difference $\Delta Te$ computed in step S3. The ECU 40 functions as one example of a compensation torque computing device relating to the present invention by executing step S4.

Figure 4:
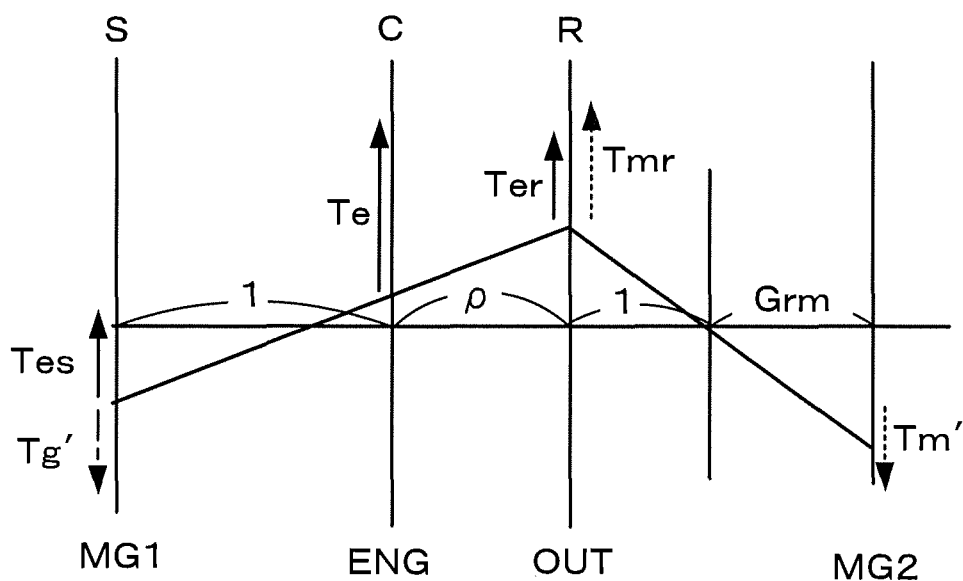
FIG. 4 is an explanatory diagram with respect to calculation of compensation torque relating to the first embodiment.

The following describes calculation of the compensation torque $\Delta Tm$ in reference to FIG. 4. FIG. 4 shows an alignment chart with respect to a power train of the vehicle 1. In this chart, "ENG" means the internal combustion engine 3, "MG1" means the first motor generator 4, "MG2" means the second motor generator 5, and "OUT" means the output shaft 20 (the same applies to FIG. 7). The engine shaft torque Te (synonymous with the output torque) to be outputted from the internal combustion engine 3 is represented by the following formula #1 composed of the torque difference $\Delta Te$ above mentioned and the output torque Teb of the lean cylinder.

$$Te = Teb + \Delta Te \qquad \#1$$

When a gear ratio of the power dividing mechanism 6 is set to $\rho$, torque Tes to be transmitted from the internal combustion engine 3 to the sun gear S of the power dividing mechanism 6 is represented by the following equation #2. Torque Ter to be transmitted to the ring gear R, that is, the output shaft 20 is represented by the following equation #3. In the equations #2 and #3, D ($\zeta$, $\theta$) is a function having a damping rate $\zeta$ and a phase delay $\theta$ as variables.

$$Tes = Te \times D(\zeta, \theta) \times \rho/(1+\rho) \qquad \#2$$

$$\begin{aligned}Ter &= Te \times D(\zeta, \theta) \times 1/(1+\rho) \\ &= (Teb + \Delta Te) \times D(\zeta, \theta)/(1+\rho)\end{aligned} \qquad \#3$$

Command torque Tg' of the first motor generator 4 corresponds to reaction force torque Tg of the torque to be transmitted to the sun gear S within the average torque Teave to be outputted from the internal combustion engine. Thereby, the command torque T'g is represented by the following equation #4.

$$Tg' = Tg = Teave \times \rho/(1+\rho) \qquad \#4$$

Command torque Tm' which the second motor generator 5 should actually output is represented by the following #5. The command torque Tm' is torque obtained by adding the compensation torque $\Delta Tm$ to the basic torque Tm which is determined depending on the required power to the vehicle 1 and the like. When the compensation torque $\Delta Tm$ is zero, the command torque Tm' is equal to the basic torque Tm. Further, when a speed reduction ratio from the second motor generator 5 to the output shaft 20 is set to Grm, torque Tmr, which is represented by the following equation #6, is transmitted to the output shaft 20.

$$Tm'=Tm+\Delta Tm \qquad \#5$$

$$Tmr=(Tm+\Delta Tm)\times Grm \qquad \#6$$

The torque Ter transmitted from the internal combustion engine 3 to the output shaft 20 and the torque Tmr transmitted from the second motor generator 5 to the output shaft 20 are transmitted to the output shaft 20 respectively. Accordingly, torque To of the output shaft 20 corresponds to a total of the torque Ter and the torque Tmr and is represented by the following equation #7.

$$To=(Teb+\Delta Te)\times D(\zeta,\theta)/(1+\rho)+(Tm+\Delta Tm)\times Grm \qquad \#7$$

With respect to the output shaft 20, in order to eliminate the torque difference between the rich cylinder and the lean cylinder, the compensation torque $\Delta Tm$ is calculated so that a fluctuating component caused by the torque difference is eliminated within the torque To of the output shaft 20. That is, with respect to the torque difference $\Delta Te$ and the compensation torque $\Delta Tm$, the following equation #8 should be established.

$$\Delta Te\times D(\zeta,\theta)/(1+\rho)+\Delta Tm\times Grm=0 \qquad \#8$$

When the equation #8 is solved with respect to the $\Delta Tm$, the following equation #9 is obtained.

$$\Delta Tm=-1/(1+\rho)\times 1/Grm\times \Delta Te\times D(\zeta,\theta) \qquad \#9$$

Back to FIG. 2, the ECU 40 calculates the command torque Tm' of the second motor generator 5 based on the equation #5, each time the compensation torque $\Delta Tm$ is calculated in step S4, and gives to the second motor generator 5 the command torque Tm' correlated with the crank angle of the internal combustion engine 3 so as to be synchronized with the current crank angle of the internal combustion engine 3 to control the second motor generator 5. Thereby, during the catalyst warming operation, the torque difference between the output torque of the rich cylinder and the output torque of the lean cylinder is eliminated on the output shaft 20.

Figure 5:
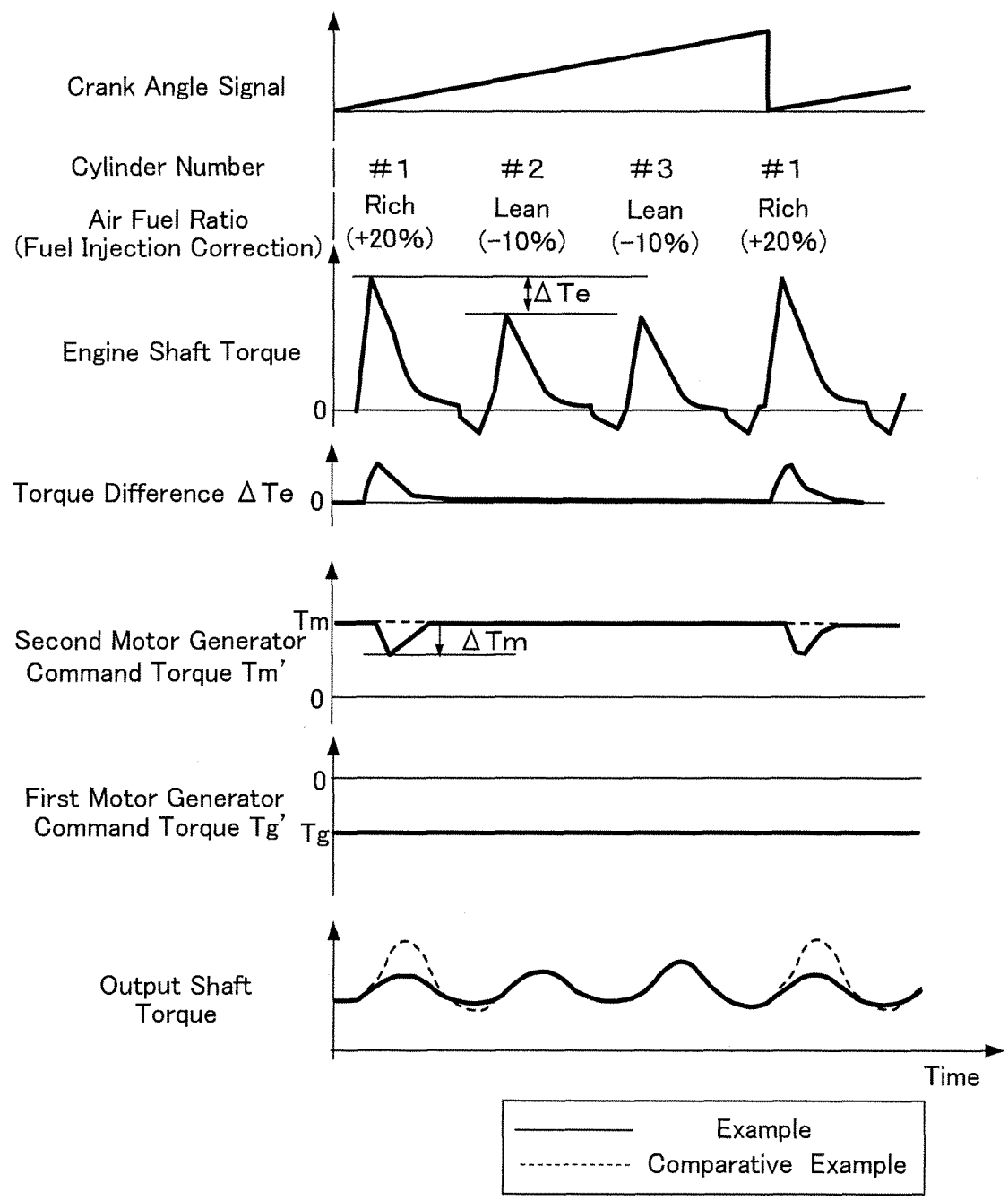
FIG. 5 is a time chart showing one example of a control result relating to the first embodiment.

FIG. 5 schematically shows one example of the control result of the above control executed by the ECU 40. In this example, the catalyst warming operation is executed in such a way as to progress in this order: the rich combustion; the lean combustion; the lean combustion; the rich combustion and FIG. 5 shows a part of the combustion progress. The engine shaft torque of the internal combustion engine 3 forms waves, each wave having a peek following the combustion order of each cylinder 10. The torque difference $\Delta Te$ to be generated between the rich combustion and the lean combustion forms a wave having a peak at the moment of the rich combustion, since the torque difference $\Delta Te$ is calculated as a difference from the lean combustion at the moment of the rich combustion.

As mentioned above, the compensation torque $\Delta Tm$ of the second motor generator 5 is calculated according to the change of the torque difference $\Delta Te$. Accordingly, considering the operation of the damper 8, the command torque Tm' of the second motor generator 5 rises at a slightly delayed timing in comparison to the wave form of the torque difference $\Delta Te$. The command torque Tg' of the first motor generator 4 is constant in this example.

Thereby, since the torque difference $\Delta Te$ between the output torque of the rich cylinder and the output torque of the lean cylinder is eliminated on the output shaft 20, the fluctuations of the torque of the output shaft 20 are suppressed in comparison to a comparative example shown by a dash line. Accordingly, it is possible to suppress the vibration and noise caused by the torque difference. Further, as mentioned above, in the present embodiment, the rich combustion and the lean combustion are executed at their appropriate ignition timings respectively and the spark retardation is not executed at the moment of rich combustion. Thereby, it is possible to avoid deterioration of fuel efficiency with respect to the internal combustion engine 3.

A Second Embodiment

Figure 6:
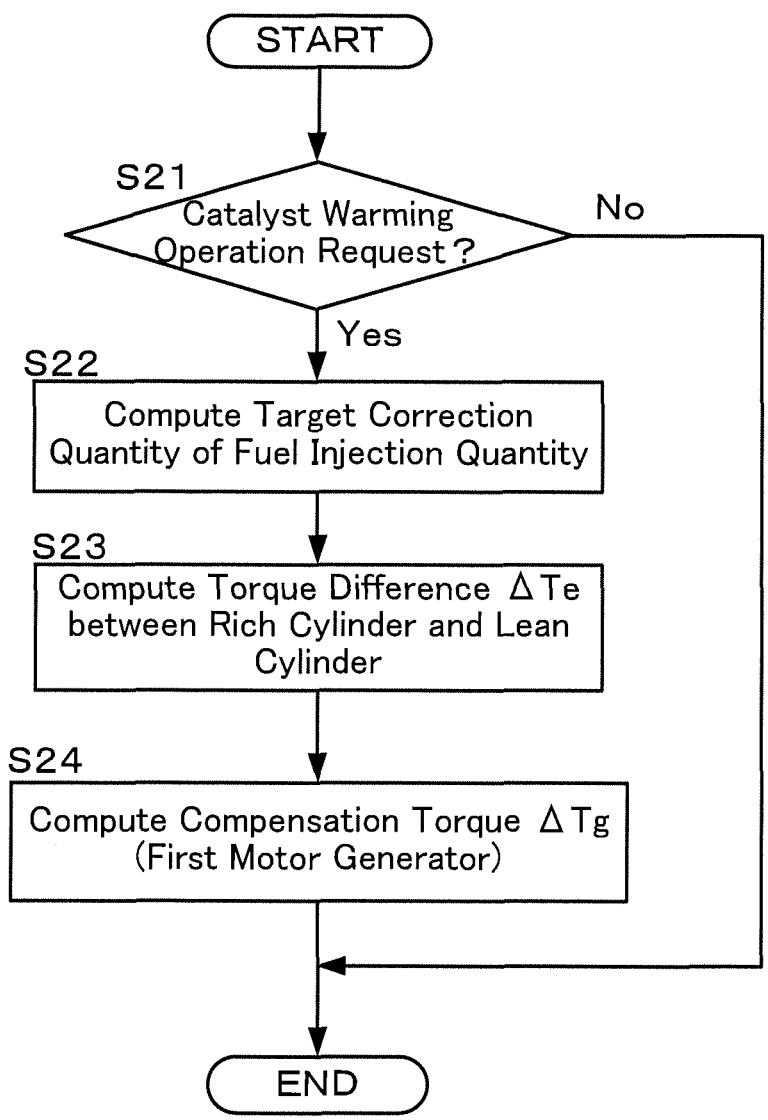
FIG. 6 is a flowchart showing one example of a control routine relating to a second embodiment.
Figure 7:
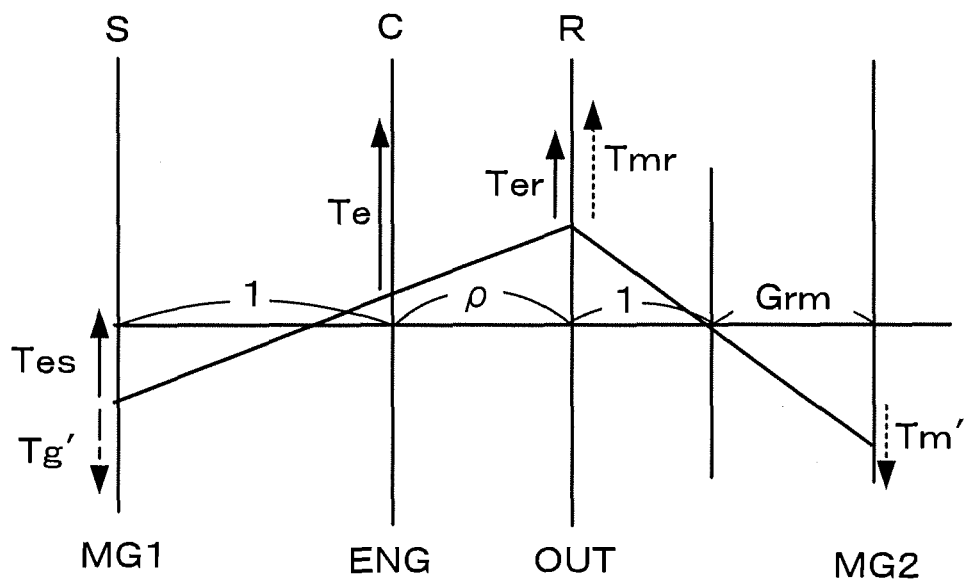
FIG. 7 is an explanatory diagram with respect to calculation of compensation torque relating to the second embodiment.
Figure 8:
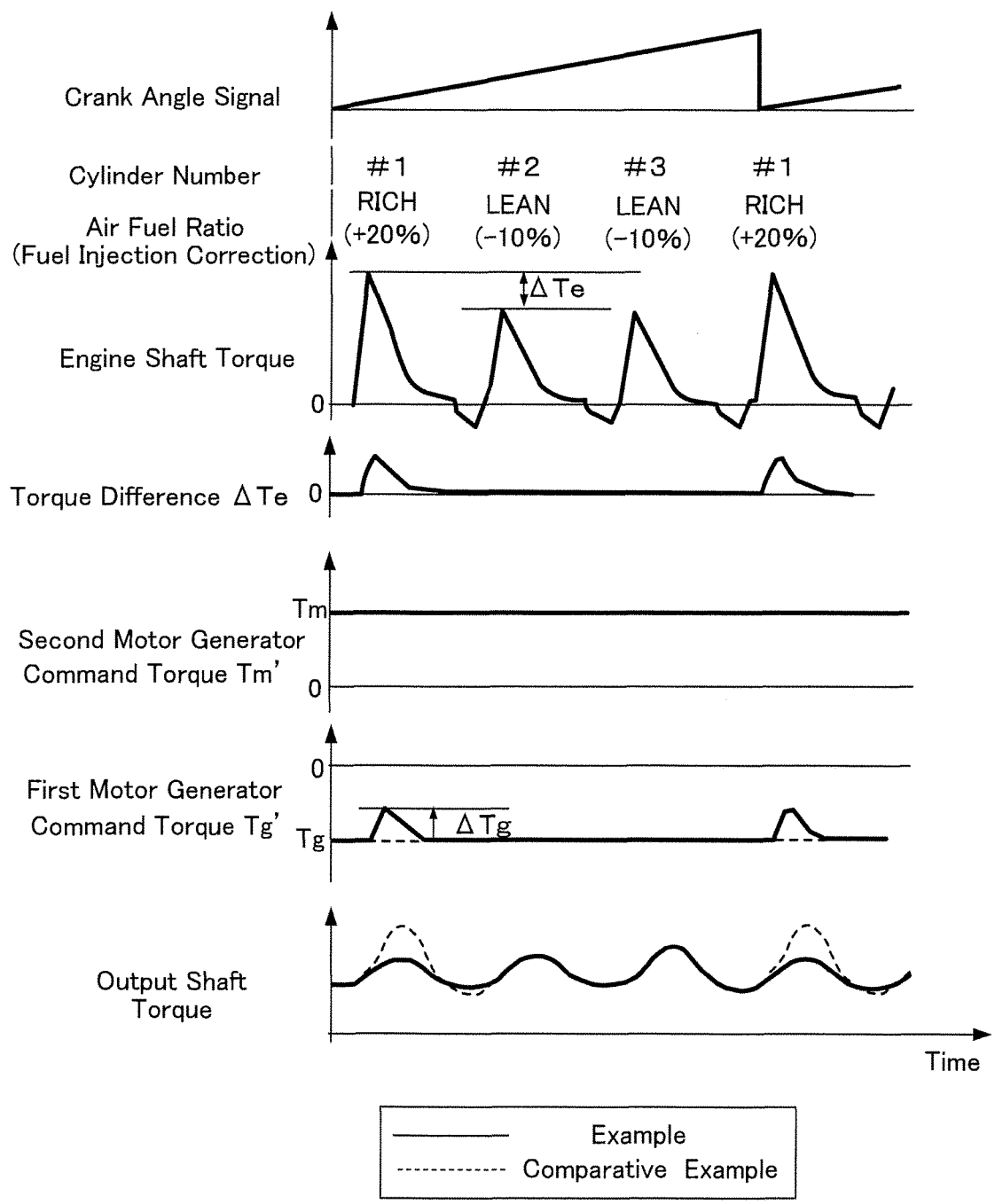
FIG. 8 is a time chart showing one example of a control result relating to the second embodiment.

Next, the following describes the second embodiment in reference to FIGS. 6 to 8. The second embodiment is the same as the first embodiment except the contents of control. Thereby, the descriptions shared with the first embodiment are omitted, and the descriptions and figures in the first embodiment should be referred as appropriate. In the second embodiment, the torque difference between the output torque of the rich cylinder and the output toque of the lean cylinder is eliminated on the output shaft 20 by the first motor generator 4. In the present embodiment, the first motor generator 4 corresponds to a rotating electrical machine and electric generator relating to the present invention.

As one example, the ECU 40 executes a control routine shown in FIG. 6. A computer program for the control routine of FIG. 6 is held in the ECU 40, and executed repeatedly at predetermined intervals. Since the processing from steps S21 to S23 in FIG. 6 is the same as the processing from steps S1 to S3, the descriptions thereof will be omitted.

In step S24, the ECU 40 calculates compensation torque $\Delta Tg$ which is torque of the first motor generator 4 which is required to eliminate on the output shaft 20, the torque difference $\Delta Te$ calculated in step S23. The ECU 40 functions as one example of a compensation torque calculating device relating to the present invention by executing step S24.

The following describes calculation of the compensation torque $\Delta Tg$ in reference to an alignment chart shown in FIG. 7. In the present embodiment, torque Tes to be transmitted from the internal combustion engine 3 to the sun gear S of the power dividing mechanism 6 is represented by the above equation #2. On the other hand, the present embodiment is for eliminating the above torque difference on the output shaft 20 by the torque of the first motor generator 4. Therefore, Torque Ter to be transmitted to the output shaft 20 is represented by the following equation #10.

$$Ter=Teb\times D(\zeta,\theta)\times 1/(1+\rho) \qquad \#10$$

Command torque Tg' of the first motor generator 4 is represented by the following equation #11. The command torque Tg' is torque obtained by adding compensation torque $\Delta Tg$ to reaction force torque Tg of torque to be transmitted to the sun gear S within the average torque Teave to be outputted from the internal combustion engine 3.

$$Tg'=-Teave\times \rho/(1+\rho)+\Delta Tg \qquad \#11$$

The command torque Tm' of the second motor generator 5 is equal to the basic torque Tm which is determined depending on the required power to the vehicle 1 and the like, and represented by the following equation #12. To the output shaft 20, torque Tmr which is represented by the following equation #13 is transmitted.

$$Tm'=TM \qquad \#12$$

$$Tmr=Tm\times Grm \qquad \#13$$

Here, the compensation torque ΔTg of the equation #11 is calculated. Angular momentum equations with respect to the internal combustion engine 3, the first motor generator 4, and the second motor generator 5 are the following equations #14 to #16 respectively. Ie indicates the moment of inertia of the internal combustion engine 3, Ig indicates the moment of inertia of the first motor generator 4, Im indicates the moment of inertia of the second motor generator 5, αe indicates the angular acceleration of the internal combustion engine 3, αg indicates the angular acceleration of the first motor generator 4, αm indicates the angular acceleration of the second motor generator 5, Te indicates the torque of the internal combustion engine 3, Tg indicates the torque of the first motor generator 4, and Tm indicates the torque of the second motor generator 5.

$$Ie \times \alpha e = Te - Tx \qquad \#14$$

$$Ig \times \alpha g = Tg + \rho/(1+\rho) \times Tx \qquad \#15$$

$$Im \times \alpha m = Tm + 1/(1+\rho) \times Tx - Tp \qquad \#16$$

Further, since each of the angular accelerations αe, αg, αm is the angular acceleration of a rotational element of the power dividing mechanism 6, the following equation #17 is established.

$$\alpha e = 1/(1+\rho) \times \alpha g + \rho/(1+\rho) \times \alpha m \qquad \#17$$

The equations #14 and #15 are substituted for the equation #17. It is assumed that the angular acceleration of time t1 with respect to the second motor generator 5, that is, the angular acceleration of time t1 with respect to the ring gear R is set to αm, and the angular acceleration with respect to the ring gear R Δt later after the time t1 is set to αm'. Each torque corresponding to the time t1+Δt is set to in this way: Te+ΔTe, Tg+ΔTg, Tm+ΔTm, Tx+ΔTx, Tρ+ΔTρ. In order to eliminate on the output shaft 20 the fluctuating component caused by the torque difference ΔTe, αm=αm' is required. Further, ΔTm=ΔTρ≈0. By the above definition, the following equation #18 is obtained.

$$(1+\rho) \times \Delta Te - \rho \times (Ie/Ig) \times \Delta Tg = 0 \qquad \#18$$

When the equation #18 is solved with respect to the compensation torque Tg, the compensation torque ΔTg is represented by the following equation #19.

$$\Delta Tg = (1+\rho)/\rho \times (Ig/Ie) \times \Delta Te \qquad \#19$$

Back to FIG. 6, the ECU 40 calculates the command torque Tg' of the first motor generator 4 based on the equation #10 each time when the compensation torque ΔTg is calculated in step S24, and controls the first motor generator 4 by giving the command torque Tg' correlated to the crank angle of the internal combustion engine 3 so as to synchronize the current crank angle of the internal combustion engine 3. Thereby, during the catalyst warming operation, the torque difference between the output torque of the rich cylinder and the output torque of the lean cylinder is eliminated on the output shaft 20.

FIG. 8 schematically shows one example of the control result of the above control executed by the ECU 40. The catalyst warming operation of this example is executed in the same pattern as the first embodiment, and the wave forms of the engine shaft torque of the internal combustion engine 3 and the torque difference ΔT are the same as those in the first embodiment respectively.

As described above, since the compensation torque ΔTg of the first motor generator 4 is calculated depending on change of the torque difference ΔTe, the command torque Tg' of the first motor generator 4 rises, considering the operation of the damper 8, at a slightly delayed timing in comparison to the wave form of the torque difference ΔTe. The command torque Tm' of the second motor generator 5 is constant in this example.

Since the torque difference ΔTe between the output torque of the rich cylinder and the output torque of the lean cylinder is eliminated on the output shaft 20, the fluctuations are suppressed in comparison to a comparative example shown by a dash line. Accordingly, it is possible to suppress vibration and noise caused by the torque difference, as with the first embodiment. And, it is also possible to avoid deterioration of fuel efficiency caused by the spark retardation at the moment of the rich combustion. This embodiment is also varied so that the torque difference is reduced.

A Third Embodiment

Figure 9:
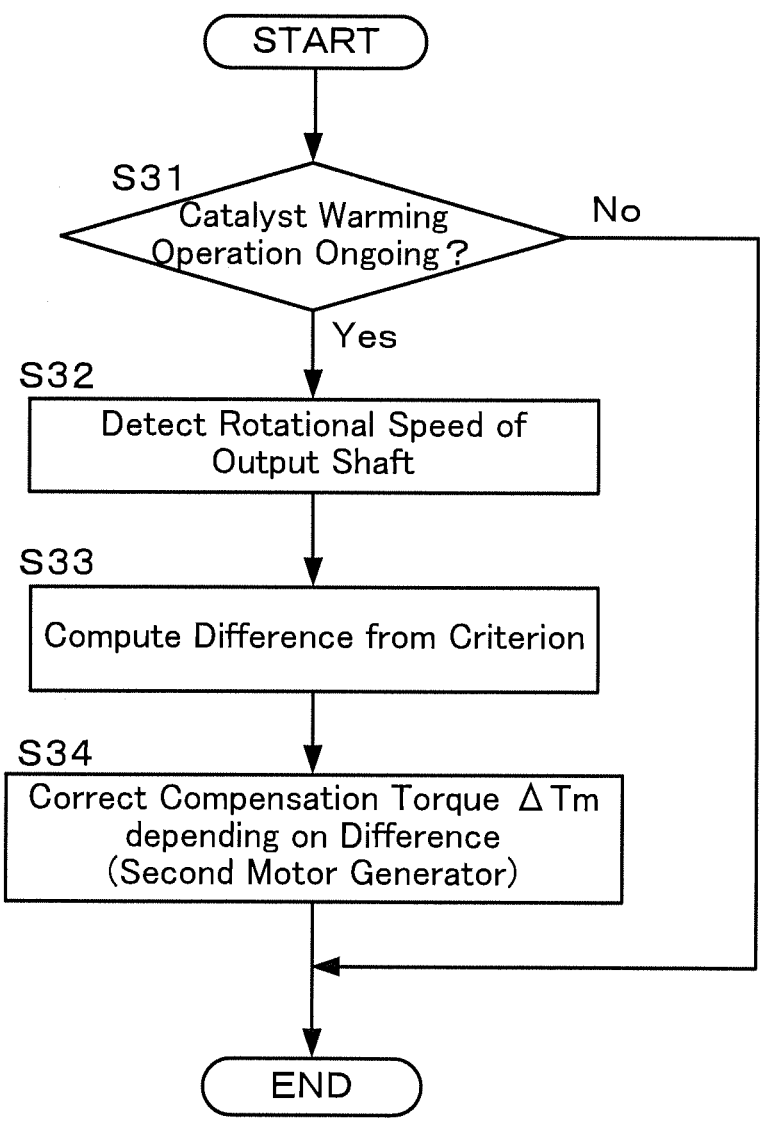
FIG. 9 is a flowchart showing one example of a control routine relating to a third embodiment.

Next, the following describes the third embodiment in reference to FIG. 9. The third embodiment is executed by combining the first and second embodiments, and in the third embodiment, the feedback correction is executed with respect to the compensation torque ΔTm or the compensation torque ΔTg during the catalyst warming operation. To each of the compensation torques ΔTm and ΔTg, a shared correction method can be applied. The following describes, as one example, a case that the compensation torque ΔTm of the second motor generator 5 is corrected, and with respect to the correction of the compensation torque ΔTg of the first motor generator 4, the descriptions will be omitted.

FIG. 9 shows one example of a control routine which the ECU 40 executes in parallel with the control routine of FIG. 2. A computer program of the control routine shown in FIG. 9 is held by the ECU 40, and read out as appropriate and executed repeatedly at predetermined intervals.

In step S31, the ECU 40 determines whether or not the catalyst warming operation is ongoing. In a case that the catalyst warming operation is ongoing, the ECU 40 goes to step S32. If not, the ECU 40 skips the following steps and ends the current routine.

In step S32, the ECU 40 detects the rotational speed of the output shaft 20 by referring to the signal from resolver 36. Next, in step S33, the ECU 40 calculates the fluctuations of the rotational speed of the output shaft 20, for example, the fluctuation quantity for each a few milliseconds, and calculates a difference between the fluctuations of the rotational speed of the output shaft 20 and a predetermined criterion. The predetermined criterion is an upper limit of the fluctuation quantity of the rotational speed of the output shaft 20 which is allowable even if the compensation torque ΔTm is added to the fluctuation quantity. The predetermined criterion is, for example, determined by prototype tests, simulations, or the like. The fluctuations of the rotational speed of the output shaft 20 correlates with the torque fluctuations. Due to this, by monitoring the fluctuation quantity of the rotational speed, it is possible to obtain the torque fluctuations of the output shaft 20. That is, even if the torque of the output shaft 20 is not directly detected, it is possible to estimate the torque fluctuations of the output shaft 20 based on the fluctuation quantity of the rotational speed.

In step S34, the ECU 40 calculates the correction quantity depending on the difference calculated in step S33, and adds the correction quantity to the compensation torque ΔTm calculated by the control routine of FIG. 2 to correct the compensation torque ΔTm. Thereby, the feedback correction is executed with respect to the compensation torque ΔTm. The correction quantity may be calculated by the ECU 40 searching a not-illustrated map made by, for example, prototype tests, simulations, or the like, the map having a data structure which gives a value necessary for reducing or eliminating the difference above mentioned. The ECU 40 functions as one example of the correction device relating to the present invention by executing step S34.

According to the third embodiment, during the catalyst warming operation, even if the torque difference cannot be sufficiently eliminated on the output shaft 20 because of some reasons, the compensation toque is corrected so that the difference between the fluctuations of rotational speed of the output shaft 20 and the predetermined criterion is reduced or eliminated. Thereby, since the torque difference is ameliorated so as to be eliminated sufficiently along with progress of the catalyst warming operation, the reliability of the control is improved. This embodiment may be also varied so that the torque difference is reduced.

The present invention is not limited to the above embodiments, and can be executed in various embodiments within a range of a subject matter of the present invention. An applied object which the present invention is applied to is not limited to a hybrid vehicle having a configuration shown in FIG. 1. For example, it is possible to apply the present invention to a hybrid vehicle having a configuration that one motor generator is directly connected to an internal combustion engine.

In each of the above embodiments, the torque difference is eliminated by using only one of either the first motor generator 4 or the second motor generator 5. However, it is possible to execute the present invention in an embodiment such that the motor generators 4 and 5 share the reduction or elimination of the torque difference. In this case, the first motor generator 4 and second motor generator 5 correspond to a rotating electrical machine of the present invention. Further, the first motor generator 4 corresponds to an electric generator relating to the present invention, and the second motor generator 5 corresponds to an electric motor relating to the present invention. In a case of the embodiment that the electric generator and electric motor share the reduction or elimination in this way, each compensation toque is smaller than compensation torque calculated in a case that either an electric generator or an electric motor is singularly used. Accordingly, for example, lowered is a probability of a state that the torque difference cannot be reduced or eliminated sufficiently because the compensation torque is insufficient, due to adherence of the rated torque of an electric generator or an electric motor, or due to avoidance of torque change which changes across zero. Thereby, the reliability of the control is heightened.

Figure 10:
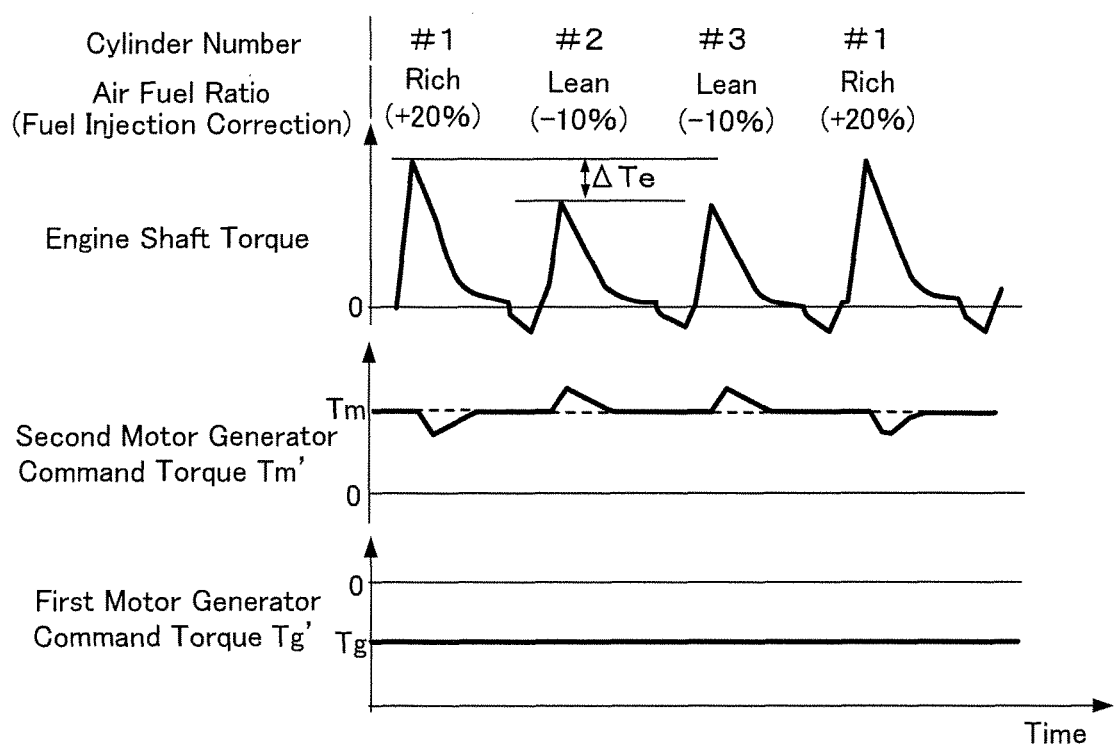
FIG. 10 is a time chart showing a variation of the first embodiment.

As a variation of the first embodiment, the embodiment shown in FIG. 10 may be applied to the present invention. In this variation, as shown in FIG. 10, the torque difference is reduced or eliminated on the output shaft 20 by reducing the output torque of the second motor generator 5 as an electric generator at the moment of combustion of the rich cylinder, and increasing the output torque of the second motor generator 5 at the moment of combustion of the lean cylinder. In this case, during the catalyst warming operation, power consumption of the second motor generator 5 increases and also decreases without not only increasing. Due to this, it is possible to reduce change of remaining quantity of the HVV buttery 30 which is one example of an electric storage device provided as a power source of the second motor generator 5. In this case, the torque difference generated by one time switching between the rich combustion and the lean combustion is reduced or eliminated dividedly in two steps. Accordingly, since the compensation toque of each step becomes smaller, it becomes difficult to exceed the rated torque of the electric motor for example. Thereby, the reliability of the control is improved.

Figure 11:
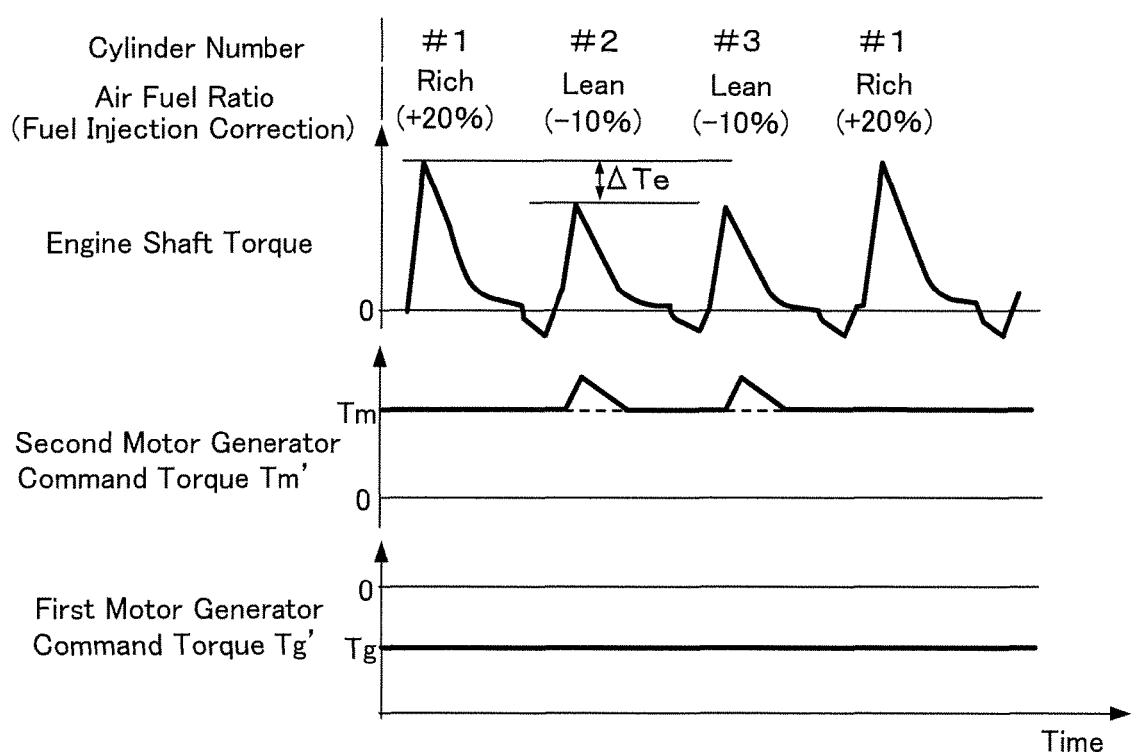
FIG. 11 is a time chart showing another variation of the first embodiment.

As another variation of the first embodiment, as shown in FIG. 11, the present invention can be executed in an embodiment such that the torque compensation is not executed at the moment of combustion of the rich cylinder, and instead of that, at the moment of combustion of the lean cylinder, output torque of the second motor generator 5 is increased. In this case, during the catalyst warming operation, torque difference is reduced or eliminated in conformity with the output torque of the rich cylinder which is larger than the output torque of the lean cylinder. Due to this, there is a merit that decrease of drivability is suppressed during the catalyst warming operation.

In the each of the above embodiments, the spark retardation is not executed. However, the present invention can be executed in an embodiment such that the torque control of each embodiment and the spark retardation are executed together. In this case, it is possible to reduce the quantity of spark retardation. On this point, there is a merit such that deterioration of fuel efficiency of an internal combustion engine can be reduced in comparison with a case that the torque difference is eliminated only by the spark retardation.

This application claims the benefit of foreign priority to Japanese Patent Application No. JP2017-029884, filed Feb. 21, 2017, which is incorporated by reference in its entirety.

What is claimed:

1. A control apparatus for a hybrid vehicle, the hybrid vehicle having: an internal combustion engine; a rotating electrical machine; and an output shaft provided on a transmission path where torque from each of the internal combustion engine and the rotating electrical machine is transmitted, and the internal combustion engine having a plurality of cylinders and an exhaust purification catalyst, wherein the control apparatus executes a computer program to function as:

a warming control device which is configured to make the internal combustion engine perform a catalyst warming operation which prompts warm-up of the exhaust purification catalyst by controlling air fuel ratios so as to provide, while combustion of the plurality of cylinders is being progressed sequentially, at least one of the plurality of cylinders performs rich combustion in which an air fuel ratio is at a rich side than a theoretical air fuel ratio and remaining cylinder(s) of the plurality of cylinders perform(s) lean combustion in which an air fuel ratio is at lean side than a theoretical air fuel; and a rotating electrical machine control device which is configured to control torque of the rotating electrical machine so that a torque difference between output torque from a rich cylinder where the rich combustion is performed and a lean cylinder where the lean combustion is preformed is reduced or eliminated on the output shaft.

2. The control apparatus according to claim 1, further functioning as:

a compensation torque computing device which is configured to compute compensation torque which is outputted by the rotating electrical machine in order to reduce or eliminate the torque difference on the output shaft;

a detection device which is configured to detect a rotational speed of the output shaft; and a correction device which is configured to perform feedback correction of the compensation torque so that a deviation between fluctuations of the rotational speed of the output shaft detected by the detection device and a predetermined criterion is reduced or eliminated during the catalyst warming operation.

3. The control apparatus according to claim 1, wherein at least either one of an electric generator which is driven by the internal combustion engine and an electric motor which is capable of transmitting torque to the output shaft is provided as the rotating electrical machine, and
   the rotating electrical machine control device is configured to control torque of at least one of the electric generator and the electric motor which is provided as the rotating electrical machine.

4. The control apparatus according to claim 3, wherein
   the rotating electrical machine control device is configured to reduce the output torque of the electric motor at a moment of combustion of the rich cylinder, so that the torque difference is reduced or eliminated on the output shaft during the catalyst warming drive.

5. The control apparatus according to claim 3, wherein
   the rotating electrical machine control device is configured to reduce the output torque of the electric motor at a moment of combustion of the rich cylinder and also increase the output torque of the electric motor at a moment of combustion of the lean cylinder, so that the torque difference is reduced or eliminated on the output shaft during the catalyst warming drive.

6. The control apparatus according to claim 3, wherein
   the rotating electrical machine control device is configured to increase the output torque of the electric motor at a moment of combustion of the lean cylinder, so that the torque difference is reduced or eliminated on the output shaft during the catalyst warming drive.

* * * * *